(12) United States Patent
Ito et al.

(10) Patent No.: US 6,169,644 B1
(45) Date of Patent: Jan. 2, 2001

(54) READ/WRITE DEVICE

(75) Inventors: Hiroshi Ito; Satoru Akutsu; Yusuke Yamaoka; Nobuaki Miyake; Masakatsu Sato, all of Tokyo (JP)

(73) Assignee: Mitsushita Denki Kabushiki Kaisha, Tokyo (JP)

( * ) Notice: Under 35 U.S.C. 154(b), the term of this patent shall be extended for 0 days.

(21) Appl. No.: 09/312,706

(22) Filed: May 17, 1999

(30) Foreign Application Priority Data

Sep. 10, 1998 (JP) .................................................. 10-256266
Oct. 28, 1998 (JP) .................................................. 10-306848

(51) Int. Cl.[7] .............................. G11B 5/55; G11B 21/08; H02K 37/00
(52) U.S. Cl. ....................... 360/267.3; 310/49 R; 310/254
(58) Field of Search ................................. 310/49 R, 254; 360/266.2, 267.3, 267.4, 99.03

(56) References Cited

U.S. PATENT DOCUMENTS

| 3,575,650 | * | 4/1971 | Fengler | 318/135 |
|---|---|---|---|---|
| 3,801,842 | * | 4/1974 | Touchman | 310/49 R |
| 3,914,859 | * | 10/1975 | Pierson | 29/596 |
| 4,048,531 | * | 9/1977 | Buess et al. | 310/49 R |
| 5,418,413 | * | 5/1995 | Satomi | 310/12 |
| 5,705,864 | * | 1/1998 | Takano et al. | 310/49 R |
| 5,811,903 | * | 9/1998 | Ueno et al. | 310/90 |

FOREIGN PATENT DOCUMENTS

| 61-244257 | 10/1986 | (JP) . |
|---|---|---|
| 2-287983 | 11/1990 | (JP) . |
| 8-149784 | 6/1996 | (JP) . |
| 8-205511 | * | 8/1996 | (JP) . |

* cited by examiner

Primary Examiner—William Klimowicz

(57) ABSTRACT

There is described a read/write device which enables realization of miniaturization, a reduction in weight, improvement in the accuracy of step feed, and reliability. The read/write device includes heads, a carriage, a stepper motor for moving the carriage stepwise, and a medium drive motor for spinning a recording medium. The stepper motor further includes a rotor, a first stator which is formed from multi-layer magnetic material and is fixedly positioned so as to surround the rotor, a second stator formed in substantially the same way as the first stator, and a holder for housing the first and second stators.

17 Claims, 10 Drawing Sheets

READ/WRITE DEVICE

BACKGROUND OF THE INVENTION

1. Field of the Invention

The present invention generally relates to a read/write device which has a removable disk-shaped recording medium and writes data on the medium or reads data recorded on the medium and, more particularly, to such a read/write device equipped with a stepper motor.

2. Description of the Background Art

A former read/write device (not shown) is equipped with a claw-poll type stepper motor (not shown) such as that described in Japanese Patent Application Laid-open No. 9-154271. In general, the claw-poll stepper motor comprises a stator made of a metal plate and a rotor provided in the stator. The stator is formed so as to enclose the outside of a ring-shaped drive coil and have spin-shaped teeth inserted from both side of the openings of the drive coil and fitted inside the same. The rotor is provided in an annular space formed in the spine-shaped teeth of the stator.

In a claw-poll stepper motor provided in a former read/write device, spine-shaped teeth of the stator require a high degree of profile precision, and a high degree of mounting precision is required when the teeth are placed in the motor. Therefore, machining of spine-shaped teeth requires a high-precision drawing technique, and predetermined enough strength is required for retaining the profile precision of the spine-shaped teeth.

With recent miniaturization of and a reduction in weight of a read/write device, there exists a demand for a more compact and light-weight stepper motor. When the state is made thinner and reduced in weight in order to realize such a stepper motor, the stator and the spine-shaped teeth thereof decrease in strength, thereby making it difficult to hold the profile precision of the spine-shaped teeth. As a result, variations arise in the precision of step feed, which in turn causes variations in the accuracy of positioning of a head. Consequently, the reliability of the read/write device is deteriorated. Further, since the stator and the spine-shaped teeth thereof decrease in strength, the profile precision of the stator and its spine-shaped teeth is difficult to maintain during the processes of manufacturing a stepper motor. Such a problem causes a decrease in the productivity of a stepper motor and by extension a decrease in the productivity of a read/write device. A stepper motor is mounted on the main unit through use of screws. When the position of the head is adjusted (such an adjustment will be hereinafter referred to as an "alignment adjustment"), there are involved laborious operations such as loosening of the screws, rotation of the stepper motor in the direction in which the rotor rotates, and re-fastening of the screws.

SUMMARY OF THE INVENTION

The present invention has been conceived to solve the previously-mentioned problems, and a general object of the present invention is to provide a novel and useful read/write device.

A more specific object of the present invention is to provide a read/write device which is equipped with a stepper motor employing a new structure in place of a claw-poll structure and which enables miniaturization, a reduction in weight, and an improvement in reliability such as an improvement in the accuracy of step feed.

Above object of the present invention is achieved by a read/write device described below. The device includes heads for writing data on and reading data recorded on a disk-shaped recording medium. The device also includes a carriage which is equipped with the heads and is supported to as to be able to move in the radial direction of the recording medium. The device further includes a stepper motor for moving the carriage stepwise. The device moreover includes a medium drive motor for spinning the recording medium. The stepper motor comprises a rotor which has an annular magnet alternately magnetized with different polarities in a circumferential direction and has a rotary shaft on which is formed a spiral portion engaging the carriage; a first stator which is formed from multilayer magnetic material and is fixedly positioned so as to surround the rotor; a second stator which is formed in substantially the same way as the first stator and is fixedly positioned so as to surround the rotor; and a holder which rotatably retains the rotor and houses the first and second stators. Each of the first and second stators comprises a plurality of teeth which protrude toward the magnet and are arranged at regular intervals around the magnet; a joint section which joins together the base ends of the teeth and has gap angle limitation sections for limiting the angle formed between adjacent teeth; and a coil including drive coils formed on the individual teeth and a cross-over line for electrically connecting the drive coils. The first and second stators are fixedly positioned such that they are spaced a predetermined distance away from each other along the rotary shaft of the rotor and such that they are offset from each other by a predetermined angle in a rotation direction.

Other objects and further features of the present invention will be apparent from the following detailed description when read in conjunction with the accompanying drawings.

DESCRIPTION OF THE PREFERRED EMBODIMENTS

In the following, principles and embodiments of the present invention will be described with reference to the accompanying drawings.

First Embodiment

Figure 1:
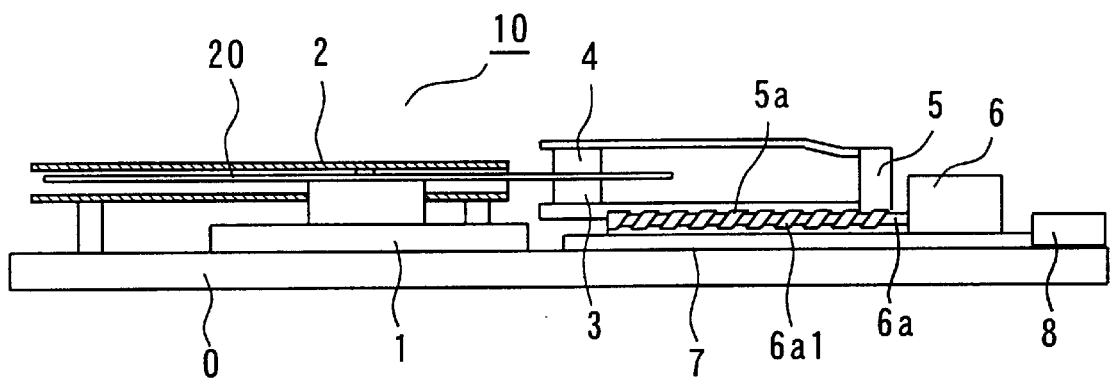
FIG. 1 is a cross-sectional view of a read/write device according to a first embodiment of the present invention.

A read/write device according to a first embodiment of the present invention will now be described. FIG. 1 is a cross-section view of a read/write device according to the first embodiment. In FIG. 1, reference numeral 1 designates a medium drive motor which retains and spins a disk-shaped recording medium 20. Reference numeral 2 designates a disk support which moves the recording medium 20 between a disk setting position located above the medium drive motor 1 and a disk ejection position located further above the disk setting position. Reference numerals 3 and 4 designate magnetic heads which write data on or read data from record tracks (not shown) of the recording medium 20. Reference numeral 5 designates a carriage which has the magnetic heads 3 and 4 mounted thereon and which is supported so as to be able to move in the radial direction of the recording medium 20 placed in the disk setting position. Reference numeral 6 designates a stepper motor which comprises a rotary shaft 6a and a spiral portion 6a1. A pin 5a of the carriage 5 engages the spiral portion 6a1 so that the carriage 5 is moved in the radial direction of the recording medium 20 in a stepped manner. Reference numeral 7 designates a control section for controlling operations of the medium drive motor 1, the magnetic heads 3 and 4, the stepper motor 6, and the like. Reference numeral 8 designates an interface which exchanges signals with external devices (not shown). Reference numeral 9 designates a frame having mounted thereon the elements designated by reference numerals 1 through 8.

Figure 2:
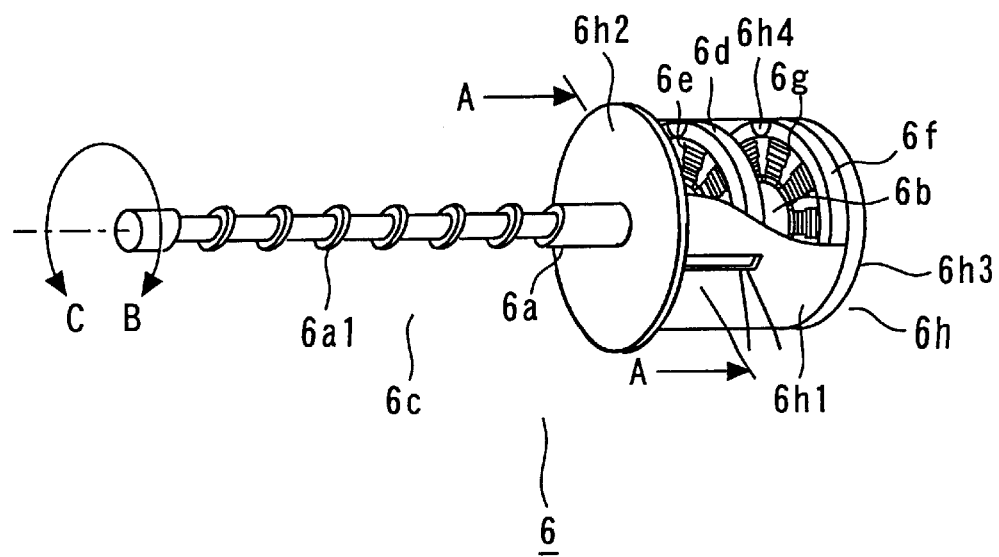
FIG. 2 is a partial cutaway perspective view showing the stepper motor shown in FIG. 1.
Figure 3:
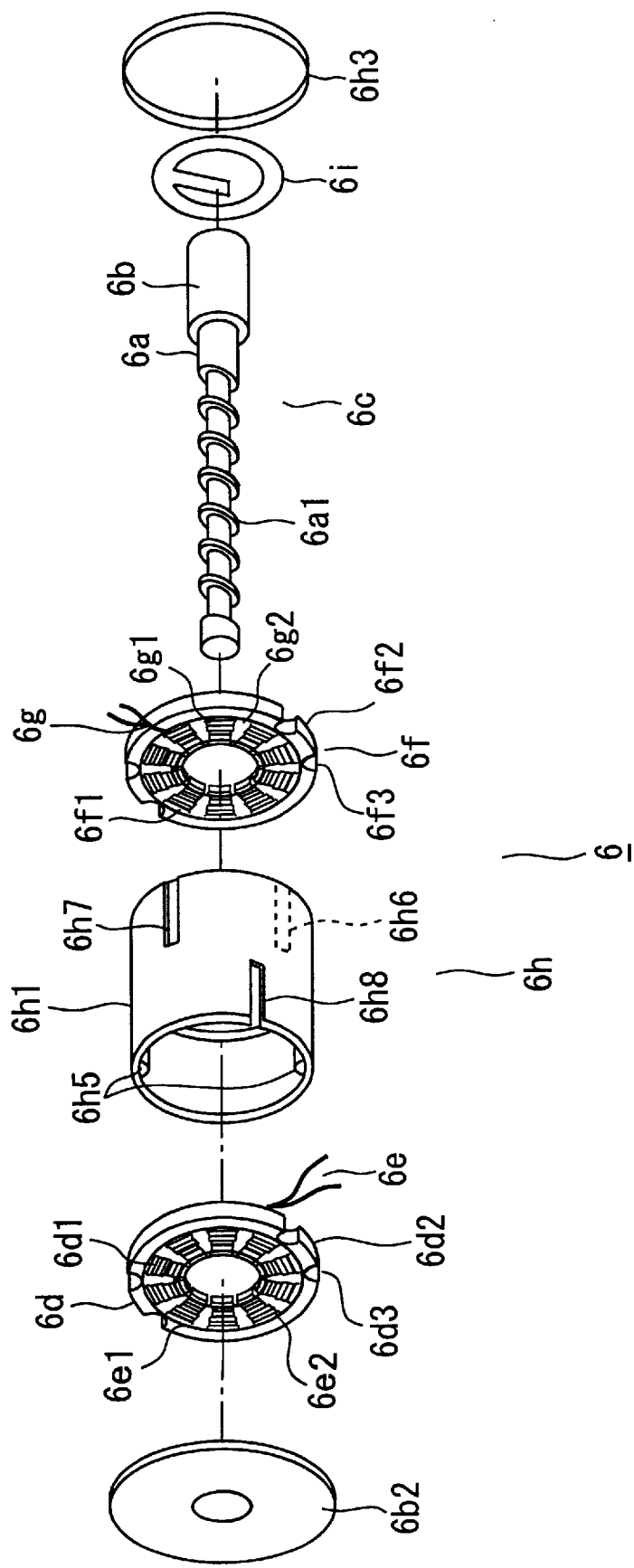
FIG. 3 is an exploded perspective view showing the stepper motor shown in FIG. 1.
Figure 4:
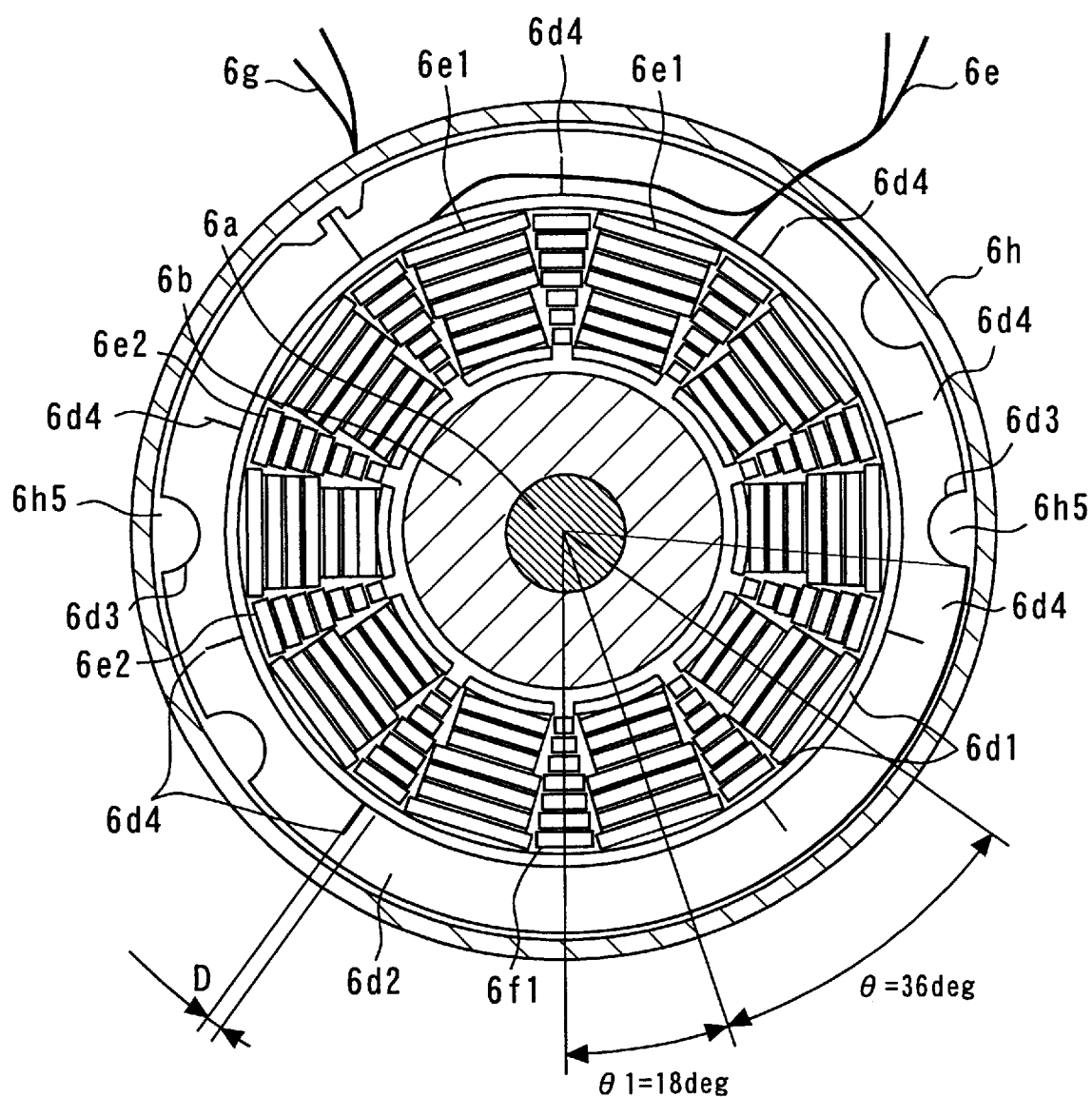
FIG. 4 is a cross-sectional view taken along line A—A shown in FIG. 2.

FIG. 2 is a partial cutaway perspective view showing the stepper motor 6 shown in FIG. 1. FIG. 3 is an exploded perspective view showing the stepper motor 6 shown in FIG. 1. FIG. 4 is a cross-sectional view taken along line A—A shown in FIG. 2.

In FIG. 2, reference numerals 6a and 6a1 designate the rotary shaft and the spiral portion, which engages the pin 5a (shown in FIG. 1). Reference numeral 6b designates a magnet which is annularly formed and is magnetized such that different polarities alternate with one another in a circumferential direction. One end of the rotary shaft 6a is fixedly fitted into the magnet 6b. The magnet 6b is provided so as to be able to spin in both rotation directions B and C along with the rotary shaft 6a. Reference numeral 6c designates a rotor which includes the rotary shaft 6a and the magnet 6b.

Further, reference numeral 6d designates a first stator. As shown in FIGS. 3 and 4, the first stator 6d is annularly formed, and has a plurality of teeth 6d1 (ten teeth are employed in the first embodiment) protruding from the internal wall of the stator 6d toward the center of the same (i.e., toward the magnet 6b). The teeth 6d1 are arranged at regular intervals around the magnet 6b. It is noted that a gap D between the front ends of the adjacent teeth 6d1 is set so as to become equal to or smaller than the diameter of a lead wire employed in a first coil 6e. In FIG. 4, reference numeral 6d2 designates a joint section which joins together the base ends of the respective teeth 6d1. The joint section 6d2 has positioning indentations 6d3 and gap angle limitation sections 6d4. The gap angle limitation sections 6d4 limit the angle formed between the adjacent teeth 6d1 to a predetermined angle θ (θ is set to an angle of 36 degrees in the first embodiment).

In FIG. 2, reference numeral 6e designates the first coil, which includes drive coils 6e1 and cross over lines 6e2. As shown in FIGS. 3 and 4, each of the drive coils 6e1 are formed by winding a lead wire having a diameter of, e.g., about 0.12 mm around a tooth 6d1. The lead wire is wound simultaneously around one of odd-numbered teeth 6d1 and one of even-numbered teeth 6d1 which are adjacent each other. The drive coils 6e1 are electrically connected by means of the cross-over lines 6e2.

In FIG. 2, reference numeral 6f designates a second stator 6f which is formed so as to become identical in shape and dimension with the first stator 6d. As shown in FIG. 3, the second stator 6f comprises a plurality of teeth 6f1, a joint section 6f2 for joining together the base ends of the individual teeth 6f1, positioning indentations 6f3, and gap angle limitation sections (not shown) corresponding to the gap angle limitation sections 6d4.

In FIG. 2, reference numeral 6g designates a second coil. As in the case of the first coil 6e, the second coil 6g comprises drive coils 6g1 formed by winding a lead wire around odd-numbered teeth 6f1 and even numbered teeth 6f1, and cross-over lines 6g2 which electrically connects the drive coils 6g1.

The first and second coils 6e and 6g are formed from lead wires covered with sheaths having four colors. In the first embodiment, the odd-numbered teeth 6d1 are assigned red-colored sheaths, and the even-numbered teeth 6d1 are imparted blue-colored sheaths. The odd-numbered teeth 6f1 are imparted green-colored sheaths, and the even-numbered teeth 6f1 are imparted copper-colored sheaths.

In FIG. 2, reference numeral 6h designates a holder which comprises a cylindrical portion 6h1, a rotor support 6h2 and a press portion 6h3. The cylindrical portion 6h1 houses the first and second stators 6d and 6f. The rotor 6c is supported in a spinnable manner by the rotor support 6h2 while being pressed by the press portion 6h3.

Reference numeral 6h4 designates a spacer which is provided substantially at the longitudinal center of the cylindrical portion 6h1 on the internal wall surface of the same. The spacer 6h4 is annularly formed so as to protrude toward the center of the cylindrical portion 6h1. The presence of the spacer 6h4 provides a given interval between the first and second stators 6d and 6f in the longitudinal direction of the holder 6h.

In FIG. 3, reference numerals 6h5 and 6h6 designates positioning protuberances which engage the positioning indentations 6d3 and 6f3, respectively, so as to determine relational positions between the holder 6h and the stator 6d and between the holder 6h and the stator 6f.

In FIG. 3, reference numerals 6h7 and 6h8 designates slits formed in the holder 6h1. The slit 6h8 is cut in the opening edge of the cylindrical portion 6h1 in the axial direction for the purpose of permitting pulling out of the end of the lead wire of the coil 6e, and the slit 6h7 is cut in the other opening edge of the cylindrical portion 6h1 in the axial direction for the purpose of permitting pulling out of the end of the lead wire of the coil 6g. The slits 6h7 and 6h8 are formed in the positions where the ends of the coils 6e and 6g can be pulled out without difficulty and involvement of extension or breakage of the lead wire. Reference numeral 6i designates a spring which presses the rotor 6c toward the rotor support 6h2.

Figure 5:
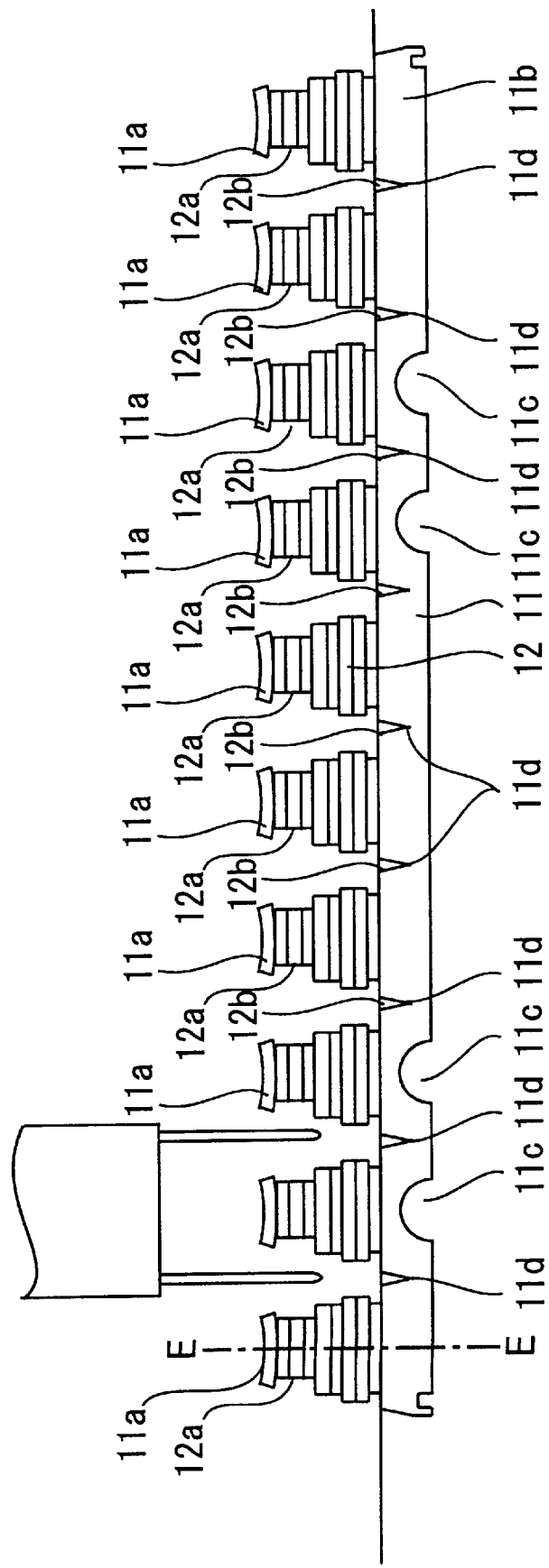
FIG. 5 is a schematic representation for describing a method of manufacturing stators and coils.
Figure 6:
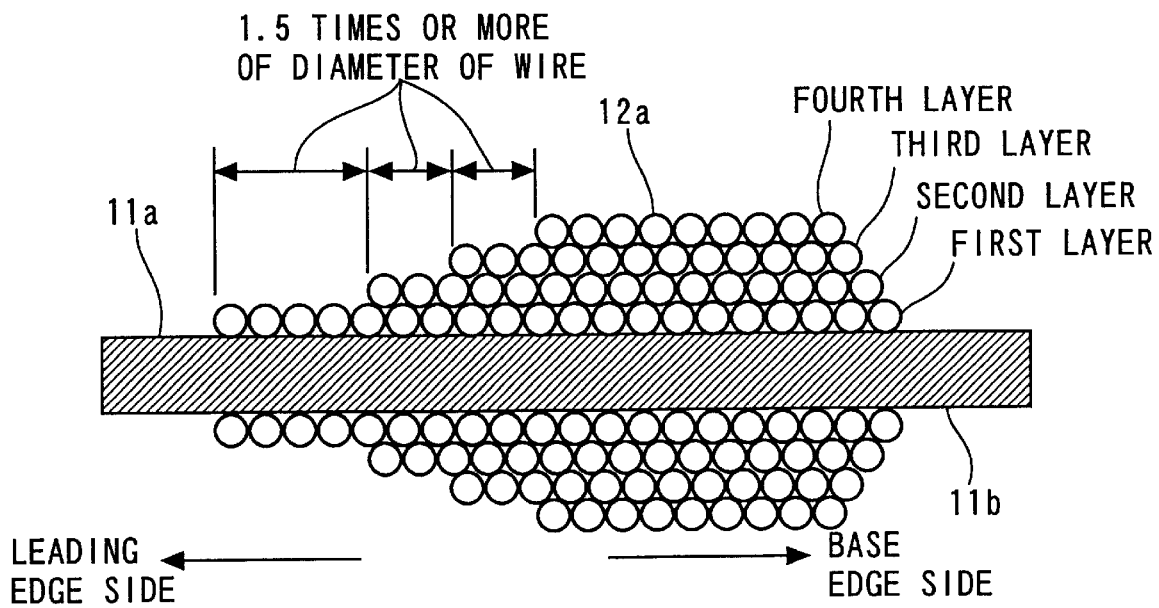
FIG. 6 is a cross-sectional view taken along line E—E provided in FIG. 5.

With reference to the drawings, a description will now be given of a method of manufacturing the first and second stators 6d and 6f and the coils 6e and 6f of the stepper motor 6. FIG. 5 is a schematic representation for describing a method of manufacturing stators and coils. FIG. 6 is a cross-sectional view taken along line E—E provided in FIG. 5. In FIG. 5, the same references are assigned to the elements which are identical with or correspond to those shown FIGS. 2 through 4, and repetition of their explanations is omitted. Reference numeral 11 designates a stator formed by punching magnetic material into shapes as shown in FIG. 5 and by stacking the thus-punched pieces. A stator formed by machining the stator 11 into an annular shape corresponds to the first and second stators 6d and 6f shown in FIGS. 2 through 4. A plurality of teeth 11a correspond to the teeth 6d1 and 6f1 shown in FIGS. 2 through 4, and a joint section 11b corresponds to the joint sections 6d2 and 6f2 in the same manner. Further, positioning indentations 11c correspond to the positioning indentations 6d3 and 6f3, and gap angle limitation sections 11d correspond to the gap angle limitation sections 6d4 of the first stator 6d and the gap angle limitation sections 6d4 (not shown) of the second stator 6f. The gap angle limitation sections 11d are formed by cutting in the joint section 11b V-shaped notches, each having a gap angle of 36 degrees.

Reference numeral 12 designates a coil formed by winding around the stator 11 two types of lead wires having a line diameter of 0.12 mm and two different colors. The coil 12 corresponds to the first and second coils 6e and 6g shown in FIGS. 2 through 4. A drive coil 12a corresponds to the drive coils 6e1 and 6g1 shown in FIGS. 2 through 4, and a crossover line 12b corresponds to the crossover lines 6e2 and 6g2.

The coil 12 is formed by winding a lead wire around the stator 11 punched through press-working. For instance, when the first stator 6d (shown in FIG. 2) is manufactured, the odd-numbered teeth 11a are coiled with a red-colored lead wire, and the even-numbered teeth 11a are coiled with a blue-colored lead wire so as to manufacture the drive coil 12. During the manufacturing process, the red lead wire and the blue lead wire are simultaneously winded around an odd numbered tooth 11a and an even numbered tooth 11a. As shown in FIG. 6, the lead wire is coiled around the tooth 11a in a plurality of layers such that the lead wire coiled around the base end of the tooth 11a becomes greater in the number of layers than the lead wire coiled around the leading edge of the tooth 11a. Specifically, the coil has a greater thickness toward the base end of the tooth 11a than toward its leading end. Further, the lead wire is coiled around the tooth 11a such that a leading edge side end of an upper layer lead wires (e.g., the fourth layer) are setback from a leading edge side end of a lower layer lead wires (e.g., the third layer) provided right under the upper layer (e.g., the fourth layer) from one another, by a distance of about 1.5 times or more the diameter of the lead wires. After completion of winding of the lead wires, the two lead wires are electrically connected together so as to become a single lead wire.

A cylindrical tool (not shown) is brought into contact with the leading edge of the tooth 11a on the rightmost (or leftmost) end in FIG. 5, and the joint section 11b is bent, thereby rendering the stator 11 annular in such a way that the teeth 11a surround the tool. At this time, in each of the gap angle limitation sections 11d, the opposing surfaces are brought together, so that the adjoining teeth 11a are disposed with a predetermined angle θ (θ=36°) therebetween. The profile of the leading edge of the tooth 11a is set such that the gap between the leading edges of the adjacent teeth 11a becomes smaller than or equal to the diameter of the lead wire. As a result of the foregoing processing, the first stator 6d shown in FIGS. 2, through 4 can be readily manufactured. When the second stator 6f is manufactured, the stator may be manufactured in an analogous manner through use of lead wires of different colors.

Since the first and second stators 6d and 6f of the stepper motor 6 are annularly formed from multilayer magnetic material as mentioned above, the stators 6d and 6f have a predetermined enough strength and can retain their profile precision. The first stator 6d is spaced a predetermined interval E away from the second stator 6f along the rotary shaft 6a of the rotor 6c. Further, the first stator 6d and the second stator 6f are fixedly positioned so as to be offset from each other in a rotation direction by a predetermined angle θ1. Accordingly, the stepper motor 6 can reduce variations in the accuracy of step feed and improve the reliability thereof.

Further, the stepper motor 6 comprises the joint section 6d2 that joins together the base ends of the individual teeth 6d1 and has the gap angle limitation sections 6d4 for limiting the angle formed between the adjacent teeth, and the joint section 6f2 that joins together the base ends of the individual teeth 6f1 and has gap angle limitation sections corresponding to the gap angle limitation sections 6d4. By means of these joint sections, the first and second stators 6d and 6f can be readily formed annularly with high precision. Further, as shown in FIG. 5, the teeth 11a are joined together in parallel and in line with one another at first. Then the coil 12 is formed by simultaneously winding two lead wires around the individual teeth 11a while the leading edges of the teeth 11a are sufficiently spaced away from one another. Finally, the stator 11 is bent annularly. Consequently, the interval between the leading edges of adjacent teeth 11a can be set so as to equal to or smaller than the diameter of the lead wire. Accordingly, a large opposing area can be ensured between the magnet 6b and the teeth 11a (corresponding to the teeth 6d1 and 6f1), thereby improving magnetic efficiency.

The sheathes of the coils 12 are colored according to the phase, thus enabling easy identification of the ends of the coils 12. This in turn makes soldering operations more efficient.

The lead wire of the drive coil 12a is wound around the tooth 11a so as to becomes greater in the number of layers in the vicinity of the base end of the tooth 11a than in the vicinity of the leading edge of the same. Therefore, the lead wire can be wound in a comparatively large number of layers. Even if the upper layer of the drive coil becomes loosened, the lead wire can be prevented from protruding from the vicinity of the leading edge of the teeth. Further, the lead wire is coiled around the tooth 11a such that the leading edge side end of an upper layer lead wire is setback from the leading edge side end of a lower layer wire provided right under the upper layer wire from one another by a distance of about 1.5 times or more the diameter of the lead wire. Therefore, even if an upper layer of the drive coil becomes loosened, the lead wire can be more reliably prevented from protruding from the vicinity of the leading edge of the tooth 11a.

Operations of the read/write device 10 will now be explained by reference to the drawings. The read/write device 10 receives an instruction from an external device (not shown) by way of the interface 8 and operates according to the instruction. For example, when the read/write device 10 receives an instruction for reading data from a record track which is spaced 20 tracks away, in the advancing direction, from the current track position of the magnetic heads 3 and 4, a drive current is applied to the first and second coils 6e and 6g of the stepper motor 6 according to a two-phase bipolar drive method, thereby spinning the rotor 6c two rotations. In the stepper motor 6, the first stator 6d has ten teeth 6d1, and the second stator 6f has ten teeth 6f1. The stepper motor 6 is arranged so as to advance or recede 10 tracks every rotation of the rotor 6c. Since the first stator 6d is positioned so as to be offset 18° from the second stator 6f in the rotation direction, the rotor 6c rotates stepwise among positions, in each of which there is achieved a balance between the magnetic flux of the tooth 6d1 and the magnetic flux of the tooth 6f1. As a result, the carriage 5 is moved by 20 tracks, thereby positioning the magnetic heads 3 and 4 in a predetermined record track of the recording medium 20. The data magnetically-recorded in that record track are converted into an electrical signal, and the thus-converted electric signal is output to an external device by way of the interface 8.

In the read/write device 10 according to the first embodiment, the stepper motor 6 has the rotor 6c. The rotor 6c includes the annular magnet 6b that is alternately magnetized with different polarities in a circumferential direction and the rotary shaft 6a having the spiral portion 6a1 that engages the carriage 5. The stepper motor 6 also has the first stator 6d that is fixedly formed from multilayer magnetic material so as to surround the rotor 6c. The stepper-motor 6 also has the second stator 6f that is formed so as to be substantially identical with the first stator 6d and is fixedly positioned so as to surround the rotor 6c. The stepper motor 6 further includes the holder 6h that rotatably supports the rotor 6c and houses the first and second stators 6d and 6f. The first and second stators 6d and 6f include the plurality of teeth 6d1 and 6f1, respectively, that are formed so as to protrude toward the magnet 6b and to be positioned at regular intervals around the magnet 6b. The first and second stators 6d and 6f also includes the joint sections 6d2 and 6f2, respectively, each of which joins together the base ends of the teeth 6d1 or the teeth 6f1 and have the gap angle limitation sections 6d4 or 6f4 for limiting the angle formed between the adjacent teeth. The first and second stators 6d and 6f further includes the coils 6e and 6g, respectively, each of which contains the drive coils 6e1 or 6g1 formed on the individual teeth 6d1 or 6f1 and the cross-over lines 6e2 or 6g2 for electrically connecting together the drive coils 6e1 or 6f1. The first stator 6d and the second stator 6f are spaced a given interval away along the rotary shaft 6a of the rotor 6c and being fixedly positioned so as to be offset from each other by predetermined angle θ1 in the rotative direction. By means of the foregoing configuration, the stepper motor can be miniaturized and reduced in weight. Further, variations in the precision of step feed can be reduced, and there can be achieved improvement in the reliability of the stepper motor and, by extension, improvement in the reliability of the read/write device.

Second Embodiment

Figure 7:
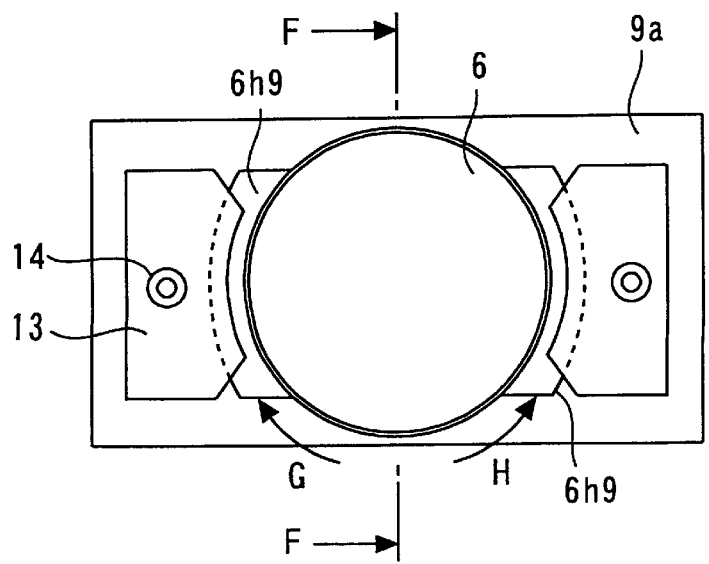
FIG. 7 is a plane view of a stepper motor according to a second embodiment of the present invention.
Figure 8:
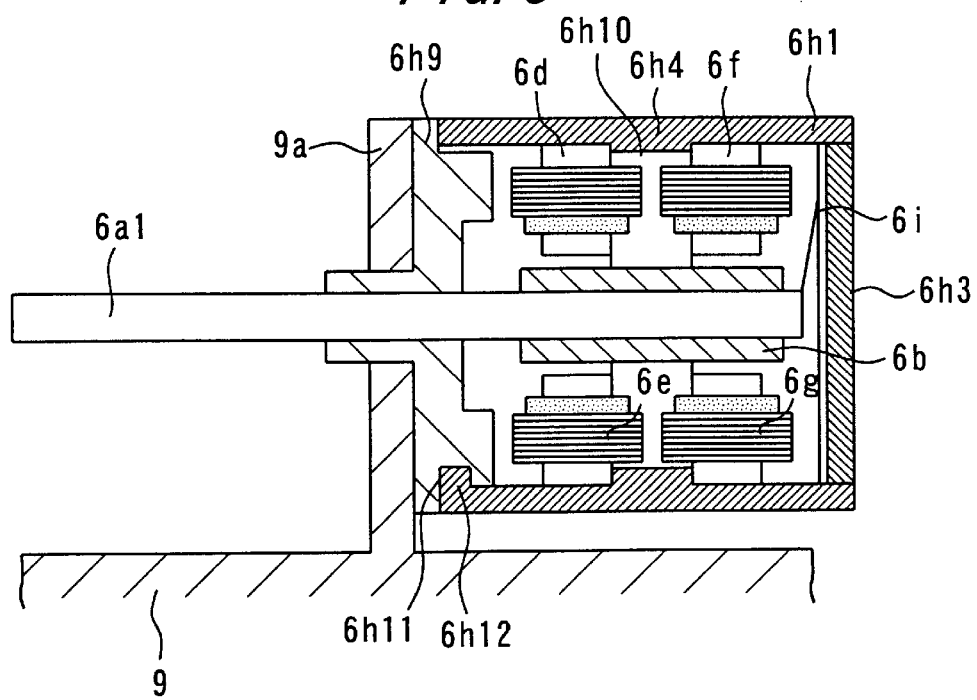
FIG. 8 is a cross-sectional view taken along line F—F shown in FIG. 7.
Figure 9:
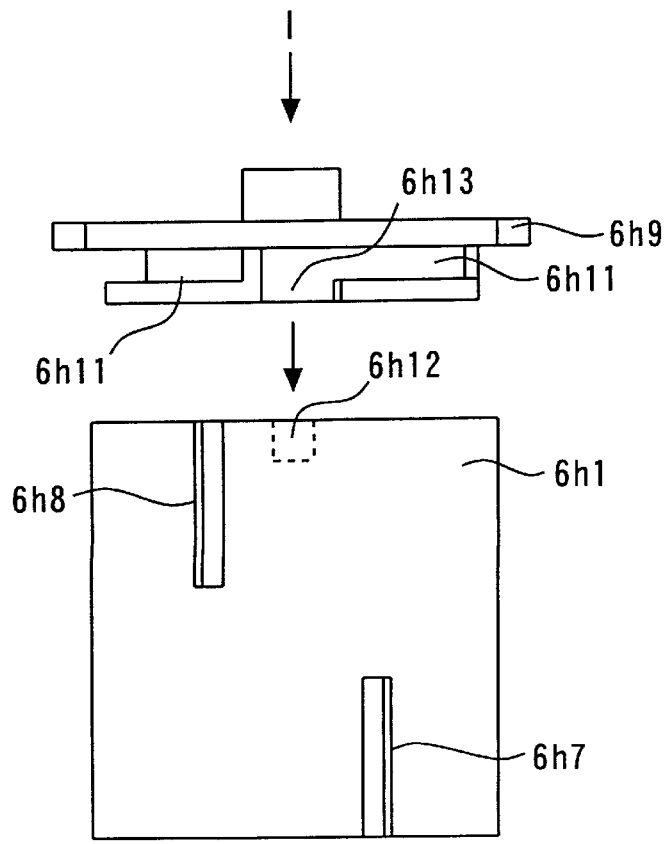
FIG. 9 is a schematic representation for describing a manner for assembling a cylindrical holder and the flange shown in FIG. 7.
Figure 10A:
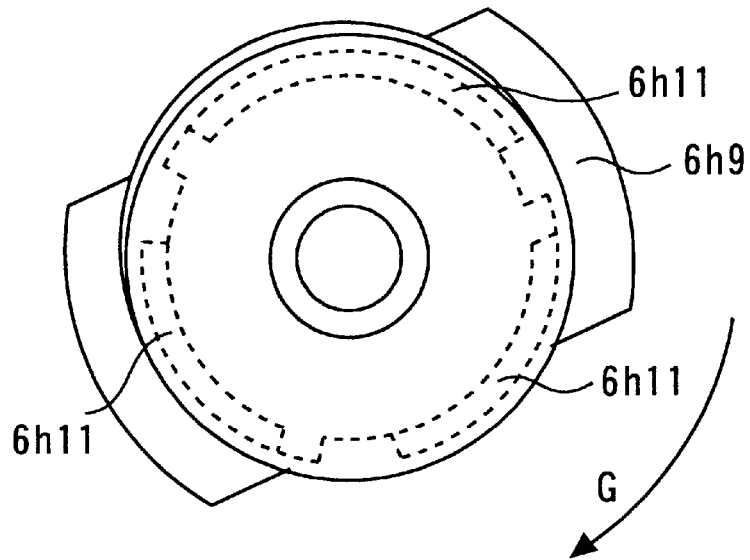
FIGS. 10A and 10B are top views of the flange shown in FIG. 9.
Figure 10B:
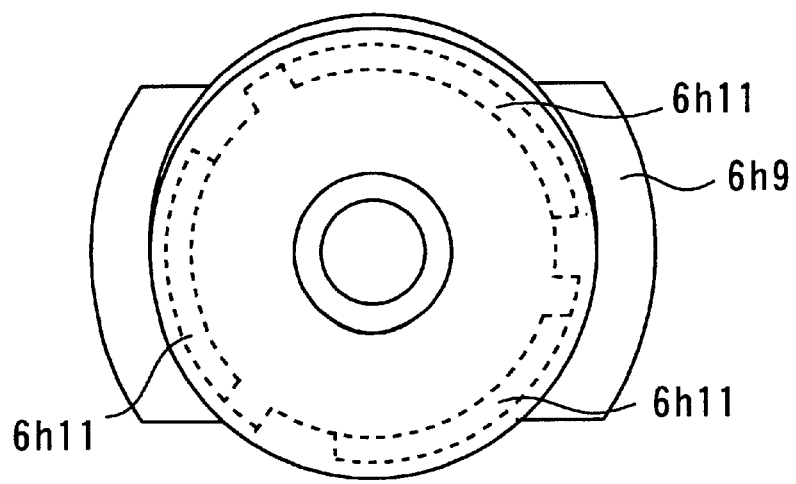
Figure 11:
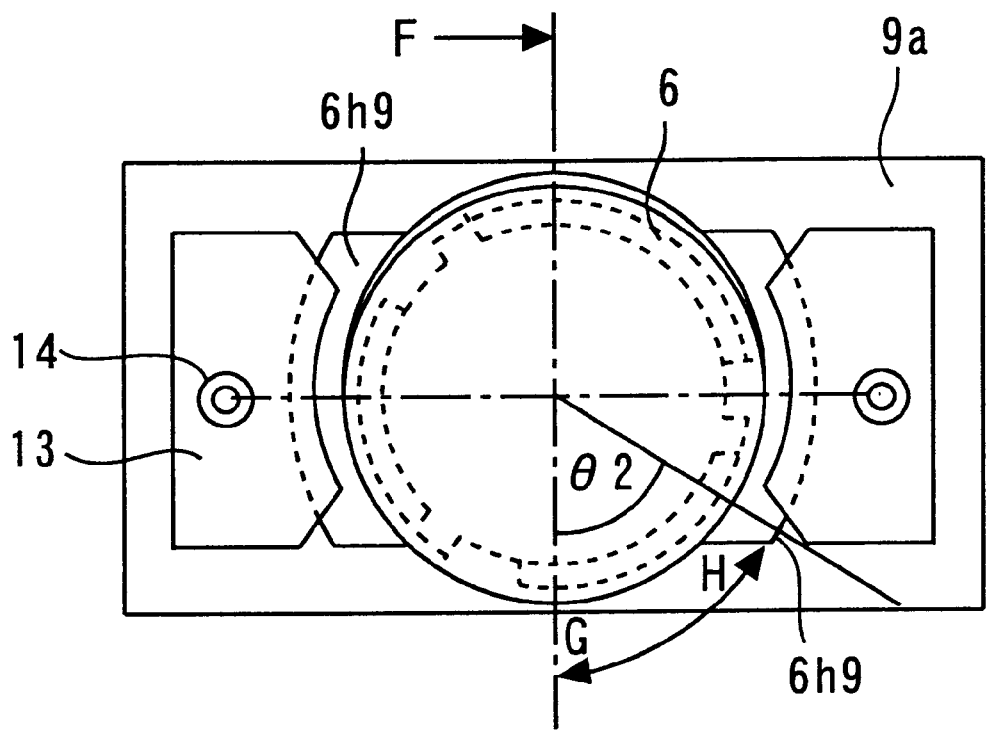
FIG. 11 is a plan view for describing a range of alignment adjustment of the stepper motor shown in FIG. 7.

A read/write device according to a second embodiment of the present invention will now be described. FIG. 7 is a plan view showing the read/write device according to the second embodiment. In FIG. 7, reference numeral 6h9 designates a flange; reference numeral 13 designates a flange-fixing holder; and reference numeral 14 designates a screw. The flange 6h9 of the stepper motor 6 is pressed by the flange-fixing holder 13 and is fixed to the frame 9 by fastening the screws 14. FIG. 8 is a cross-sectional view taken along line F—F shown in FIG. 7. Reference numeral 6h10 designates a spacer indentation, and reference numeral 6h11 designates a flange groove, which is formed in the circumferential direction. Reference numeral 6h12 designates a holder protuberance that protrudes from the interior surface of the cylindrical portion 6h1 toward the rotor 6c. The cylindrical portion 6h1 and the flange groove 6h11 are formed from resin moldings, and the outer diameter of the cylindrical portion 6h1 assumes a value of about 20 mm. The flange 6h9 is formed from a metal plate. The flange groove 6h11 that engages the cylindrical portion 6h1 and the flange 6h9 are molded into a single unit. FIGS. 9, 10A, and 10B are schematic representations for describing the assembly of the flange shown in FIG. 7. FIGS. 10A and 10B are top views of the flange shown in FIG. 9. FIG. 11 is a plan view for describing alignment adjustment of the stepper motor. Throughout FIGS. 7 through 11, elements which are the same as those shown in FIGS. 1 through 6 are assigned the same reference numerals, and repetition of their explanations is omitted here.

Operations of the stepper motor will now be described. The spacer indentation 6h10 is formed at a point of intersection between an imaginary extension of the slit 6h7 and the spacer 6h4—i.e., the area of the spacer 6h4 which is in contact with the first stator 6d—, as well as at a point of intersection between an imaginary extension of the slit 6h8 and the spacer 6h4—i.e., the area of the spacer 6h4 which is in contact with the second stator 6f. By means of the spacer indentations 6h10, the end of the coil 6e can be prevented from being pinched between the spacer 6h4 and the stator 6d, and the end of the coil 6g can be prevented from being pinched between the spacer 6h4 and the stator 6f. Thus, the end of the coil can be prevented from being broken. Further, as shown in FIG. 9, the flange 6h9 is fitted into the cylindrical portion 6h1 by insertion of the holder protuberance 6h12 into the flange groove 6h11 by way of a notch 6h13. The flange 6h9 is then rotated in direction G shown in FIG. 10A. As a result, as shown in FIG. 10B, the flange 6h9 and the cylindrical portion 6h1 can be readily assembled. Further, since the holder protuberances 12 engage the flange grooves 6h11, the holder 6h can rotate through an angle of θ2=72° corresponding to two tracks of the record track of the read/write device while being guided by the flange grooves 6h11, as shown in FIG. 11. Accordingly, at the time of alignment adjustment of the read/write device, the cylindrical portion 6h1 is rotated in direction G or H shown in FIG. 11 without loosening the screws 14 that fix the flanges 6h9 on a stationary piece 9a of the frame 9. After completion of alignment adjustment of the stepper motor 6, the interior surface of the holder 6h and the outer surface of the flange grooves 6h11 that are in contact with each other are fixedly bonded.

In the read/write device according to the second embodiment, since the spacer indentations 6h10 are formed in the spacer 6h4, the end of the coil 6e can be prevented from being pinched between the spacer 6h4 and the first stator 6d, and the end of the coil 6g can be prevented from being pinched between the spacer 6h4 and the second stator 6f. Thus, the end of the coil can be prevented from being broken, thereby enabling realization of the highly reliable stepper motor 6.

Further, since the holder 6h is formed so as to be able to rotate with respect to the flange 6h9 while the holder protuberances 6h12 engage the flange grooves 6h11, the stepper motor 6 can be readily adjusted while being fixed on the frame 9. Further, the flanges 6h9 formed from a metal plate and the flange grooves 6h11 formed from plastic moldings are formed into a single unit, thus enabling easy formation of the flanges 6h9 and the flange grooves 6h11.

Third Embodiment

Figure 12:
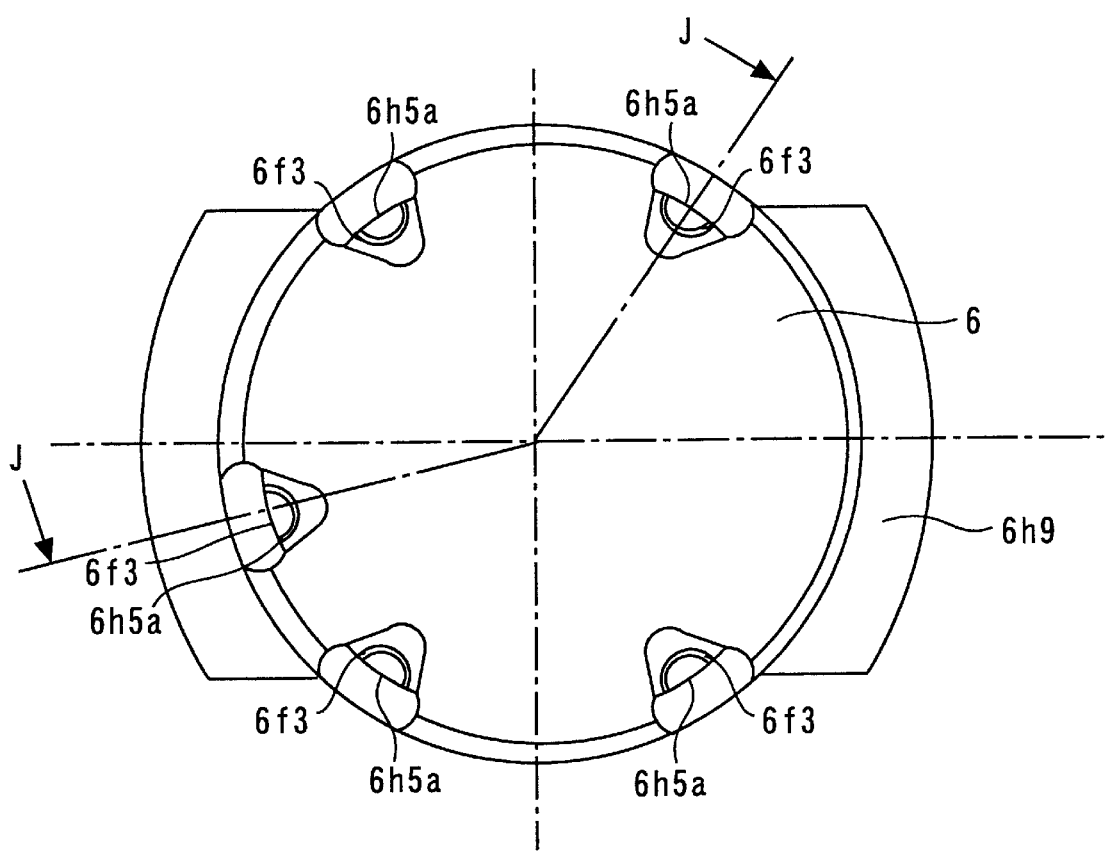
FIG. 12 is a plane view of a stepper motor according to a third embodiment of the present invention.
Figure 13:
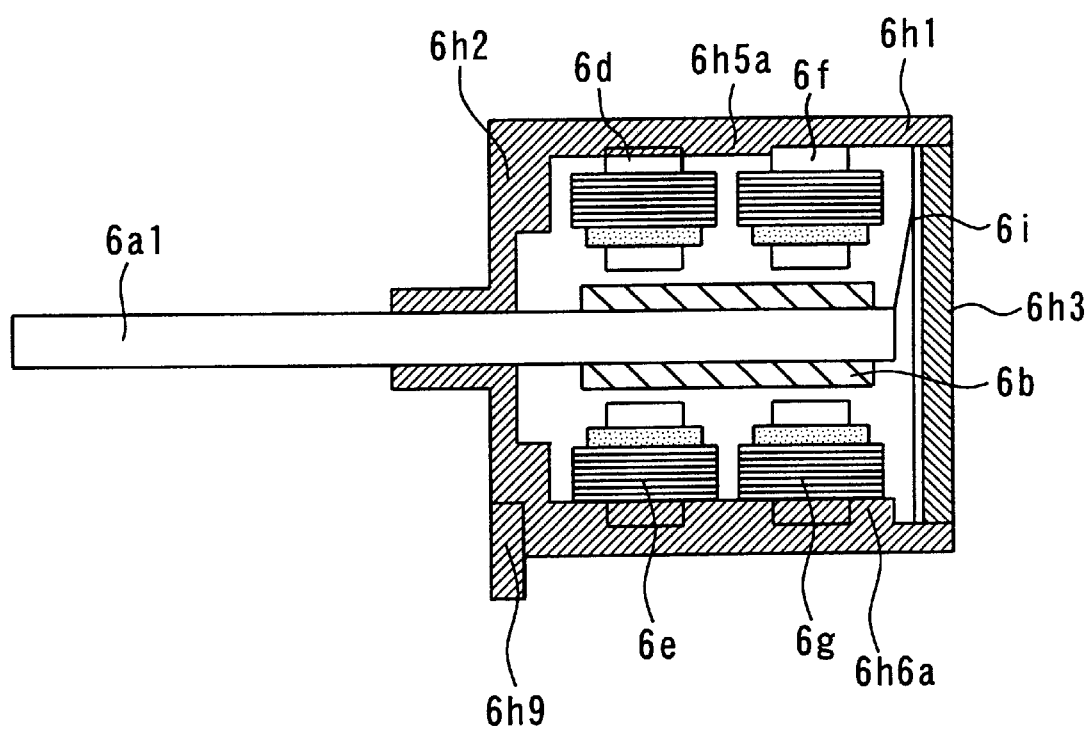
FIG. 13 is a cross-sectional view taken along line J—J shown in FIG. 12.

A read/write device according to a third embodiment of the present invention will now be described. FIG. 12 is a schematic representation showing a stepper motor according to the third embodiment. FIG. 13 is a cross-sectional view taken along line J—J shown in FIG. 12. In FIGS. 12 and 13, elements which are the same as those shown in FIGS. 1 through 11 are assigned the same reference numerals, and repetition of their explanations is omitted here. Reference numeral 6h5a designates a plurality of positioning protuberances which are formed in the internal wall surface of the cylindrical portion 6h1. The end surface of the positioning protuberances 6h5a facing the press portion 6h3 (shown in FIG. 2) and the end surface of the spacer 6h4 (shown in FIG. 2) facing the press portion 6h3 are substantially in the same plane. Reference numeral 6h6a designates a positioning protuberance 6h6a which is formed on the internal surface of the cylindrical portion 6h1. The cylindrical portion 6h1 and the rotor support 6h2 are formed from moldings and are formed integrally with the flanges 6h9.

Operations of the stepper motor will now be described. In the first stator 6d, the presence of the positioning protuberances 6h5a prevents the first stator from rotating. The ends of the positioning protuberances 6h5a protrude beyond the coil 6e of the first stator 6d toward the press portion 6h3 and are in contact with the second stator 6f. The second stator 6f is positioned so as to be offset by a given angle from the first stator 6d by means of the positioning protuberance 6h6a. Further, the second stator 6f is spaced a given interval away from the first stator 6d in the axial direction by means of the positioning protuberances 6h5a. The rotor support 6h2 and the cylindrical portion 6h1 are formed into a single unit and act as a radial bearing to rotatably support the rotor 6c.

According to the third embodiment, the positioning protuberances 6h5a position the first and second stators so as to be spaced a predetermined interval away from each other in the axial direction. Thus, the cross-over lines of the coils 6e and 6f are prevented from being pinched between the spacer 6h4 and the first and second stators 6d and 6f, thereby enabling formation of the highly reliable stepper motor 6. Further, the flange 6h9, the cylindrical portion 6h1 retaining the first stator 6d and the second stator 6f, and the rotor support 6h2 are formed into a single unit, thus enabling a reduction in the number of components.

The major benefits of the present invention described above are summarized as follows:

A read/write device according to the present invention comprises: heads for writing data on and reading data recorded on a disk-shaped recording medium; a carriage which is equipped with the heads and is supported so as to be able to move in the radial direction of the recording medium; a stepper motor for moving the carriage stepwise; and a medium drive motor for spinning the recording medium. The stepper motor comprises: a rotor which has an annular magnet alternately magnetized with different polarities in a circumferential direction and has a rotary shaft on which is formed a spiral portion engaging the carriage; a first stator which is formed from multilayer magnetic material and is fixedly positioned so as to surround the rotor; a second stator which is formed in substantially the same way as the first stator and is fixedly positioned so as to surround the rotor; and a holder which rotatably retains the rotor and houses the first and second stators. Each of the first and second stators comprises: a plurality of teeth which protrude toward the magnet and are arranged at regular intervals around the magnet; a joint section which joins together the base ends of the teeth and has gap angle limitation sections for limiting the angle formed between adjacent teeth; and a coil including drive coils formed on the individual teeth and a cross-over line for electrically connecting the drive coils. The first and second stators are fixedly positioned such that they are spaced a predetermined distance away from each other along the rotary shaft of the rotor and such that they are offset from each other by a predetermined angle in a rotation direction. As a result, the stators can ensure sufficient strength, thereby resulting in realization of a compact and light weight stepper motor, a reduction in variations in the accuracy of step feed, an improvement in the reliability of the stepper motor, and, by extension, an improvement in the reliability of the read/write device.

In the read/write device according to the present invention, the stepper motor is arranged so as to move the carriage by ten tracks with every rotation of the rotor. Each of the first and second stators has ten teeth, and the angle formed between the adjacent teeth is set so as to assume a value of 36°. The first and second stators are set so as to be offset from each other by an angle of 18° in the rotation direction of the rotor. Accordingly, the carriage can be moved in increments equal to one-half track.

In the read/write device according to the present invention, the gap between the adjacent teeth among the plurality of teeth of the stepper motor is equal to or smaller than the diameter of a lead wire forming the drive coils. Therefore, a large opposing area can be ensured between the leading edges of the teeth and the magnet, and magnetic efficiency can be improved.

In the read/write device according to the present invention, the holder of the stepper motor is provided with positioning limitation sections for limiting an angular deviation between the first and second stators to a predetermined angle in the rotation direction of the rotor. Therefore, an angular deviation between the first and second stators can be readily limited.

In the read/write device according to the present invention, the outer surface of each of the first and second stators of the stepper motor is formed from a joint section and is provided with positioning indentations. The positioning limitation sections of the holder is realized by means of positioning protuberances which engage the positioning indentations. Accordingly, an angular deviation between the first and second steppers can be readily limited through use of a simple structure.

In the read/write device according to the present invention, the holder of the stepper motor is provided with a spacer for positioning the first and second stators so as to be spaced a predetermined interval away from each other along the rotary shaft. Accordingly, the coils of the first and second stators can be prevented from coming into contact with each other.

In the read/write device according to the present invention, slits for permitting the ends of the coils of the first and second stators from being pulled out are formed in the holder of the stepper motor. Accordingly, assembly processes regarding the ends of the coils can be readily performed.

In the read/write device according to the present invention, the stepper motor is of two-phase excitation type. The coils of the first and second stators have lead wires whose sheathes are of different colors according to phase. Therefore, trends of the coils canoe readily distinguished from each other, thereby enabling improvement in efficiency of soldering operations.

In the read/write device according to the present invention, the drive coils of the stepper motor are wound around each of the individual teeth such that the lead wire becomes greater in the number of layers in the vicinity of the base end of the tooth than in the vicinity of the leading edge of the same. As a result, the lead wire can be wound in a comparatively large number of layers around the tooth. Further, even if an upper layer of the lead wire of the drive coil becomes loosen, the lead wire can be prevented from protruding from the leading edge of the tooth.

In the read/write device according to the present invention, the lead wire is coiled around the tooth such that the winding end of an upper layer lead wire toward the leading edge of the tooth is setback from the winding end of a lower layer lead wire toward the leading edge of the tooth. The lower layer lead wire is provided right under the upper layer lead wire. The distance of setback of the lower layer lead wire is about 1.5 times or more the diameter of the lead wire. Therefore, even if an upper layer of the drive coil becomes loosened, the lead wire can be more reliably prevented from protruding from the leading edge of the tooth.

In the read/write device according to the present invention, the holder of the stepper motor is provided with a spacer indentation which is formed at a point of intersection between an imaginary extension of the slit and the spacer. By means of the spacer indentations, the end of the coil of the first stator can be prevented from being pinched between the spacer and the first stator, and the end of the coil of the second stator can be prevented from being pinched between the spacer and the second stator. Thus, the end of the coil can be prevented from being broken, and a highly reliably stepper motor can be produced.

In the read/write device according to the present invention, the holder of the stepper motor is formed from a resin molding and assumes an outer diameter of 20 mm or less, thereby rendering the read/write device thin.

In the read/write device according to the present invention, the holder of the stepper motor rotatably supports the rotor and is provided so as to be able to rotate relative to flanges mounted on a frame in the rotation direction of the rotor. While being mounted on the frame, the stepper motor can be readily aligned.

In the read/write device according to the present invention, the holder of the stepper motor has a protuberance so as to protrude toward the rotor and engage the flange. The flange has a groove running along its rotation direction. By means of engagement between the protuberance and the groove, the holder can rotate with respect to the flange through use of a simple structure.

In the read/write device according to the present invention, the flange of the stepper motor is formed from a metal plate, and the holder is formed from a resin molding. The flange and the holder are formed into a single unit, thereby enabling a reduction in the number of components.

In the read/write device according to the present invention, a shaft bearing of the stepper motor which supports the rotor in a rotatable manner is formed from resin, and hence the shaft bearing can be readily formed.

In the read/write device according to the present invention, the first stator is provided in the holder of the stepper motor so as to face the flange. A section for limiting the position of the holder with respect to the first stator is provided as a spacer for positioning the first and second stators so as to be spaced a predetermined interval away from each other in the rotary shaft direction of the rotor. A cross-over line of the drive coils is prevented from being pinched between the first or second stator and another member. Therefore, a highly reliable stepper motor can be manufactured.

Further, the present invention is not limited to these embodiments, but variations and modifications may be made without departing from the scope of the present invention.

The entire disclosure of Japanese Patent Application No. Hei 10-306848 filed on Oct. 28, 1998 including specification, claims, drawings and summary are incorporated herein by reference in its entirety.

What is claimed is:

1. A read/write device according to the present invention comprises:

heads for writing data on and reading data recorded on a disk-shaped recording medium;

a carriage which is equipped with the heads and is supported to as to be able to move in the radial direction of the recording medium;

a stepper motor for moving the carriage stepwise; and a medium drive motor for spinning the recording medium, wherein the stepper motor comprises:

a rotor which has an annular magnet alternately magnetized with different polarities in a circumferential direction and has a rotary shaft on which is formed a spiral portion engaging the carriage;

a first stator which is formed from multilayer magnetic material and is fixedly positioned so as to surround the rotor;

a second stator which is formed in substantially the same way as the first stator and is fixedly positioned so as to surround the rotor; and a holder which rotatably retains the rotor and houses the first and second stators, wherein each of the first and second stators comprises:

a plurality of teeth which protrude toward the magnet and are arranged at regular intervals around the magnet;

a joint section which joins together the base ends of the teeth and has gap angle limitation sections for limiting the angle formed between adjacent teeth; and a coil including drive coils formed on the individual teeth and a cross-over line for electrically connecting the drive coils; and wherein the first and second stators are fixedly positioned such that they are spaced a predetermined distance away from each other along the rotary shaft of the rotor and such that they are offset from each other by a predetermined angle in a rotation direction.

2. The read/write device according to claim 1, wherein:

the stepper motor is arranged so as to move the carriage by ten tracks with every rotation of the rotor;

each of the first and second stators has ten teeth, and the angle formed between the adjacent teeth is set so as to assume a value of 36°; and the first and second stators are set so as to be offset from each other by a predetermined angle of 18° in the rotation direction of the rotor.

3. The read/write device according to claim 1, wherein the gap between the adjacent teeth among the plurality of teeth of the stepper motor is equal to or smaller than the diameter of a lead wire forming the drive coils.

4. The read/write device according to claim 1, wherein the holder of the stepper motor is provided with positioning limitation sections for limiting an angular deviation between the first and second stators to a predetermined angle in the rotation direction of the rotor.

5. The read/write device according to claim 4, wherein:

the outer surface of each of the first and second stators of the stepper motor is formed from a joint section and is provided with positioning indentations; and the positioning limitation sections of the holder is realized by means of positioning protuberances which engage the positioning indentations.

6. The read/write device according to claim 5, wherein:
the flange of the stepper motor is formed from a metal plate;
the holder is formed from a plastic molding; and
the flange and the holder are formed into a single unit.

7. The read/write device according to claim 6, wherein a shaft bearing of the stepper motor which supports the rotor in a rotatable manner is formed from resin.

8. The read/write device according to claim 6, wherein:
the first stator is provided in the holder so as to face the flange; and
a section for limiting the position of the holder with respect to the first stator is provided as a spacer for positioning the first and second stators so as to be spaced a predetermined interval away from each other in the rotary shaft direction of the rotor.

9. The read/write device according to claim 4, wherein the holder of the stepper motor is provided with a spacer for positioning the first and second stators so as to be spaced a predetermined interval away from each other along the rotary shaft.

10. The read/write device according to claim 9, wherein:
slits for permitting the ends of the coils of the first and second stators from being pulled out are formed in the holder of the stepper motor; and
the holder of the stepper motor is provided with a spacer indentation which is formed at a point of intersection between an imaginary extension of the slit and the spacer.

11. The read/write device according to claim 4, wherein slits for permitting the ends of the coils of the first and second stators from being pulled out are formed in the holder of the stepper motor.

12. The read/write device according to claim 1, wherein:
the stepper motor is of two-phase excitation type; and
the coils of the first and second stators have lead wires whose sheathes are of different colors according to phase.

13. The read/write device according to claim 1, wherein the drive coils of the stepper motor are wound around each of the individual teeth such that the lead wire becomes greater in the number of layers in the vicinity of the base end of the tooth than in the vicinity of the leading edge of the same.

14. The read/write device according to claim 13, wherein the lead wire is coiled around the tooth such that the winding end of an upper layer lead wire toward the leading edge of the tooth is setback from the winding end of a lower layer lead wire toward the leading edge of the tooth, the lower layer lead wire being provided right under the upper layer lead wire, and the distance of setback of the lower layer lead wire being 1.5 times or more the diameter of the lead wire.

15. The read/write device according to claim 1, wherein the holder of the stepper motor is formed from a resin molding and assumes an outer diameter of 20 mm or less.

16. The read/write device according to claim 1, wherein the holder of the stepper motor is mounted on a frame, rotatably supports the rotor and is provided so as to be able to rotate relative to flanges mounted on the frame in the rotation direction of the rotor.

17. The read/write device according to claim 16, wherein:
the holder of the stepper motor has a protuberance so as to protrude toward the rotor and engage the flange;
the flange has a groove running along its rotation direction; and
by means of engagement between the protuberance and the groove, the holder can rotate with respect to the flange.

* * * * *